Oct. 16, 1962 H. SCHREINER ET AL 3,059,040
METHOD FOR PRODUCING SINTERED SEMICONDUCTOR BODIES
Filed June 14, 1960
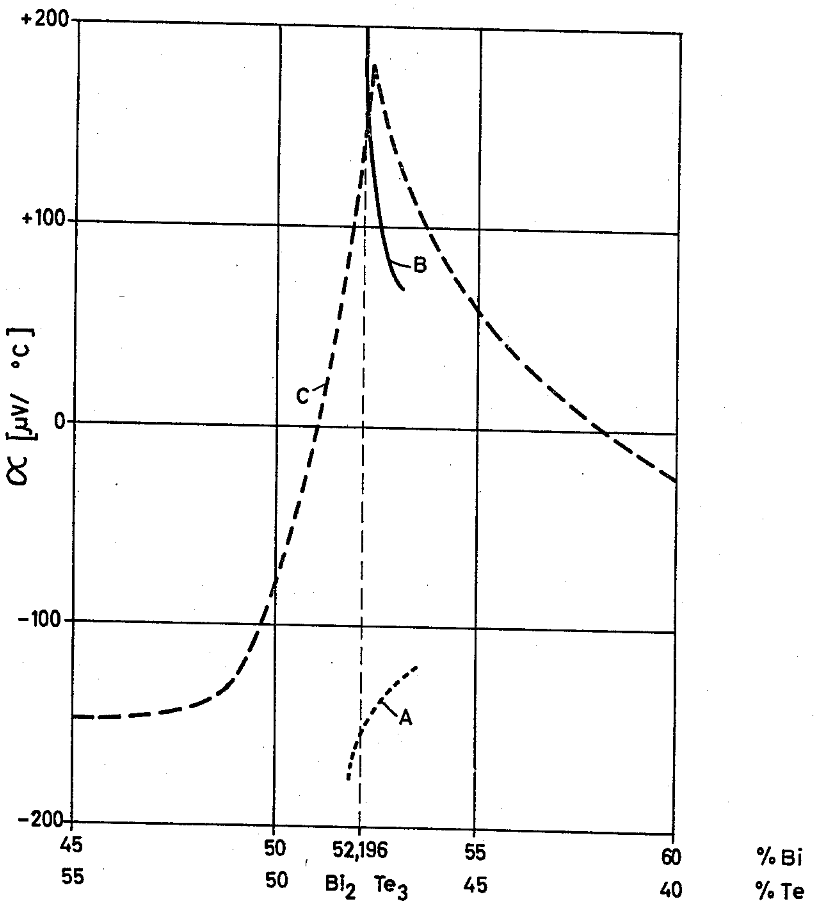

3,059,040

METHOD FOR PRODUCING SINTERED SEMI-CONDUCTOR BODIES

Horst Schreiner, Nurnberg, and Hans Böhm, Erlangen-Bruck, Germany, assignors to Siemens-Schuckertwerke Aktiengesellschaft, Erlangen, Germany, a corporation of Germany Filed June 14, 1960, Ser. No. 36,062
Claims priority, application Germany June 23, 1959
18 Claims. (Cl. 136—5)

Our invention relates to a method for producing sintered semiconductor bodies for use in electronic devices. It particularly concerns a method for producing thermoelectric materials of high thermoelectric effectiveness from semiconducting compounds, alloys, mixed crystals or other semiconducting substances.

The known sintering methods employed for production of thermoelectric materials use as starting materials a substance of the corresponding composition, for example, a pre-alloy, which is reduced to a metallic powder by means of conventional reducing or comminuting devices such as mills. The grain size of these starting powders is kept as fine as is feasible, in order to secure a good sintering effect. The sinter bodies that are made from such powder in accordance with powder-metallurgy methods, and which were applied to extrinsic-type semiconductors, did not result in the same high thermoelectric effectivity values in the p-type, and above all in the n-type conductance materials, such as are obtained when the same substances are produced by melting, for example by the normal-freezing method.

It is an object of our invention to eliminate this deficiency of the semiconductor sintering method as applied to extrinsic semiconductors, particularly for thermoelectric purposes.

In accordance with our invention, a granular powder is used as the starting material of a sintering process, employed for producing sintered compounds, mixed crystals or other compositions of semiconducting substances for thermoelectric purposes; said granular powder being obtained from the starting materials by splitting, particularly squeezing of the material between plates, by impact, beating or the like methods without incurring appreciable friction at the contacting face of reducing tool used for this purpose.

Also applicable according to the invention are starting materials which, relative to n-type or p-type conductors possess a nearly fully compensated fundamental crystal lattice structure and an optimum addition of doping substance, so that sintered bodies having the desired conductance type as well as maximum thermoelectric effectivity are produced.

The semiconductor is generally either n- or p-conducting when in a highly pure condition. For example if, in this relation, an n-conducting or p-conducting semiconductor leg or element of the couple is desired, then the doping must be so chosen that first the n-type conductance is compensated and that furthermore the desired optimum p-type doping is obtained.

Preferably used for producing sintered bodies in accordance with the invention are grain sizes between 0.06 and 1 mm. The split starting material produced according to the invention is advantageously further subjected to warm pressing, preferably at a pressure of 1 to 6 ton/$cm^2$, the warm pressing being effected within a temperature range in which the material is plastically deformable.

The material is subsequently subjected to a sintering treatment in a protective gas, inert gas, or in vacuum in sealed vessels at a temperature between 300 and 500° C. for approximately one hour.

Used as starting material for the production of the sintered bodies is a powder consisting for example of a homogeneous pre-alloy, an intermetallic compound, or of mixed crystals of two or more intermetallic compounds, and which is produced by splitting as described above. The thermoelectric properties in the starting alloy are impaired when the material is reduced to powder with the aid of conventional reducing methods such as milling in a ball mill, tube mill, swing-type crusher, and the like. Thus, the sinter bodies made from powder produced in the conventional manner exhibit lower thermoelectric effectivity values than the pre-alloys of which these bodies were made. Some sintered materials are often n-type conducting, whereas the pre-alloys from which they were made were p-conducting.

We have come to the conclusion that the cause of the above-mentioned impairment in the thermoelectric properties resides in the occurrence of a phase-boundary reaction during the grinding operation. Since the thermoelectric properties are sensitive to and depend upon such phenomena at the surface of the powder particles, the surface conditions of the powder particles can be measured and observed on the basis of or by referral to thermoelectric property values. The reaction occurring at the boundary faces of the powder, produced by the milling or other reduction method, could be traced back to atmospheric constituents, i.e. to gases, vapors and dust contained in the ambient air. However, since the above-described phenomenon is not eliminated when the grinding operation is carried out under protective gas, and while excluding humidity, it must be deduced that a reaction with the grinding tools takes place. The thin coatings that are formed at the surfaces of the reduced particles are not visible microsocpically.

By applying the novel crushing or splitting method carried out according to the invention, it has become possible to avoid the changes in powder surface that adversely affect the thermoelectric properties, or to minimize such detrimental phenomena to a great extent. In particular, according to the fundamental concept involved in our invention, the reduction of the starting material to a powder is to be performed by employing methods and devices which cause as little contact as possible of the resulting fractured or broken surfaces of the pre-alloy with foreign substances, i.e. methods or apparatus are employed which cause the pre-alloy particles to be crushed or split rather than to be ground.

Based upon the generally high brittleness of starting materials suitable for thermoelectric purposes, the following method has been found particularly advantageous: The pre-alloy is pressed between planar plates of steel or other hard materials, so that the pre-alloy is crushed and split. The fine constituents thus produced, and having the desired grain size, are separated from the remainder by any suitable known method, for example by screening. The remainder is repeatedly pressed between the planar plates, until the entire material has passed through the coarsest screen.

Surprisingly, with this reducing method it has been found that the atmospheric constituents have practically no influence upon the thermoelectric properties of the sinter bodies that are made from powder produced in this manner. However, if the powder is subsequently further reduced to a slight extent in a ball mill, then the above-described adverse surface phenomenon again takes place and the values of thermoelectric properties decrease.

The described method is not limited to the production of sintered thermoelectric materials but can be used to advantage in the manufacture of other semiconducting sintered bodies in cases where it is essential to preserve other semiconductor properties (for example the carrier mobility, and the width of the forbidden zone) during sintering in comparison with melted materials of corresponding composition. The drawing illustrates, by way of example, a graph relating to the thermo force of thermo elements made according to the invention, in comparison with those made by other methods. The particular illustration is of the binary alloy Bi-Te in the range of 45 to 60% Bi. The abscissa indicates percent by weight of Bi for the alloy range of 45 to 60% by weight of Bi. The value of the stoichiometric composition $Bi_2Te_3$ is identified. The ordinate constitutes a scale of the thermo force $\alpha$ in micro-volts per degree centigrade ($\mu$v./° C.) from −200 to +200.

All our data concerning the thermoelectric forces are listed with respect to copper as the second element of the thermocouple.

The components including doping substances are molten in evacuated quartz-tubes, and by a rotary motion (tilting motion) in vertical relation to the longitudinal axis there is obtained a homogeneous distribution of the components in the admixture.

Specimens intended for comparison with the invention were produced by a conventional reduction method, using a ball mill. The powder moiety having a grain size below 0.1 mm. was screened off. The resulting material, having a grain size from 0.1 to 1 mm., was pressed at 450° C. with a pressure of 6 ton/cm.$^2$. At this temperature the material is plastically deformable. Thereafter the resulting specimens were sintered at 380° C. for one hour in an evacuated vessel. In contrast to a corresponding body made by melting, the sintered body obtained was of n-type conductance. Its thermal force was approximately $-140 \cdot 10^{-6}$ v./° C. (at the intersection point of the 52.196 abscissa line with curve A).

The same pre-alloy was reduced in accordance with the present invention by placing it between two ground, planar steel plates, in a press. The crushed material was screened to eliminate the fines. The resulting powder having a grain size of 0.1 to 1 mm. was pressed and sintered exactly as described above. The sintered body was found to have a positive thermal force of $$+150 \cdot 10^{-6} \text{ v./° C.}$$

(curve B.) By doping the pre-alloy with 0.15% AgI, an n-type semiconductor body suitable for thermoelectric purposes is obtained having a thermo force of $$-160 \cdot 10^{-6} \text{ v./° C.}$$

In contrast it has been found that with sintered bodies made from powder produced in a ball mill the doping in some cases is virtually without effect, and that the thermoelectric properties of such bodies may depend upon accidental phenomena caused by or during the grinding operation.

For comparison the illustrated graph shows also the thermo force for melted Bi-Te of the same composition (curve C). The alloys produced by melting are of p-type conductance in the range between 51 and 58% Bi. A sharply pronounced maximum occurs at 52.4% Bi corresponding to a thermal force of $+190 \cdot 10^{-6}$ v./° C., and hence occurs somewhere beside the stoichiometric composition (52.196% Bi). This shows that thermoelectric materials produced by the sinter method permit the obtainment of the same high values of thermo force and effectivity, as well as the same conductance type, as are obtainable when the melting method is employed.

The thermoelectric applications include thermoelectric cooling.

The above information is believed to be fully adequate for advantageous application of the new technique. The following further explanation is offered.

The method is applicable generally to all other semiconducting thermoelectric materials. At the present time the following systems are of special interest: Bi-Te, Bi-Sb-Te Bi-Te-Se, Zn-Sb, Cd-Sb, Pb-Te and Ge-Te. Such systems include the compounds Zn-Sb, Cd-Sb, Pb-Te or Ge-Te, or non-stoiciometric compositions of these components, i.e. alloys. Furthermore mixed crystals are included, for example of the following type formula: $Bi_{2-x}Sb_xTe_3$, or $Bi_2Te_{3-x}Se_x$ All these materials are brittle at normal room temperature and can be converted into powder, according to the method of the invention, which powder can be fabricated by powder-metallurgical methods to provide sinter body materials. They too exhibit the advantages described above with reference to the specific example of $Bi_2Te_3$.

Thermoelectric couples having elements fashioned from these materials are described in Lindenblad U.S. Patents 2,758,146 of 1956, and 2,762,857 of 1956, and Justi Patent 2,887,283.

The preferred grain size range is between 0.06 and 1 mm. However, powders of larger grain size are applicable, in principle, but are obtained only in small proportion by the reduction or comminution, and are difficult to fill into the matrix or mold, if used by themselves without finer components, and particularly when the parts to be molded are small. Grain-size fractions smaller than 0.06 mm., when fabricated in air, exhibit the unfavorable effect of surface-coating formation due to the large total surface area of the particles. However when operating in good vacuum or protective atmosphere when producing the powder, the smaller grain-size fraction below 0.06 mm. can be used together with the larger grains. The preferred range of 0.06 to 1 mm., according to test results, is the range which economically results in sintered bodies of more favorable thermoelectric properties.

The compacting pressure below 1 ton/cm.$^2$ results in space-filling degrees of the compressed body which are below the range of 0.9 to 0.95. In such cases where a lower degree of space-filling is sufficient, the range approximately between 0.2 and 1 ton/cm.$^2$ is therefore also applicable. A compacting pressure greater than 6 t./cm.$^2$, for the warm pressing operation between 400 and 500° C., is difficult to employ advantageously, because of the properties of the material generally used for the matrix or mold. If suitable matrix materials are used, the higher range of pressure is also applicable.

The material $Bi_2Te_3$ commences at 350° C. to become sufficiently plastic, the plasticity increasing with further heating up to the melting point (585° C.). In the given example there was chosen a temperature in which the plasticity is reliably sufficient for plastic deformation free of breakage or fissure due to brittleness, and which temperature on the other hand is conveniently realizable technologically.

The sintering period for the thermoelectric substances during hot pressing (=pressure-sintering) is generally between 10 seconds and 60 minutes. Longer pressure-sintering periods are uneconomical and are preferably performed by a subsequent sintering operation without simultaneous pressure. Subsequent sintering periods are between 1 and 10 hours. The thermoelectric properties are not impaired by prolonged sintering, but in most cases improve. In contrast to metallic materials which exhibit unfavorable coarse-grain formation when heat treated for excessively long periods of time, thus exhibiting an impairment of the strength properties, all the thermoelectric materials exhibit an only slight rate of growth in grain size, so that the unfavorable effect observable with metals does not occur.

We claim:

1. A method of making a thermoelectric element of a thermocouple from semiconductor material, comprising subjecting said material to comminution by a pressing and crushing procedure which minimizes frictional contact of the surfaces of the resulting comminuted particles with foreign substances, said procedure being carried out with a minimum of friction and grinding by disposing the material between two relatively non-rotary surfaces and applying pressure, and sintering the particles together to form said element.

2. A method of making a thermoelectric element of a thermocouple from an extrinsic semiconductor material, comprising subjecting said material to comminution by a pressing and crushing procedure which minimizes frictional contact of the surfaces of the resulting comminuted particles with foreign substances, said procedure being carried out with a minimum of friction and grinding by disposing the material between two relatively non-rotary surfaces and applying pressure, separating the particle sizes that are between about 0.06 and 1 millimeter in largest dimenion, and sintering the separated particles together to form said element.

3. The method defined in claim 2, the material being taken from the bismuth-tellurium system.

4. The method defined in claim 1, the material being one that is brittle at normal room temperature, namely about 20° C.

5. The method defined in claim 1, the material being one that is brittle at the temperature of the comminution.

6. A method of making a thermoelectric element of a thermocouple from a normally brittle semiconductor material, comprising subjecting said material to a comminution operation in the substantial absence of air, which operation is carried out under conditions which minimize frictional contact of the surfaces of the resulting comminuted particles with foreign substances, including that of the comminuting tool surface, said operation being carried out with a minimum of friction and grinding by applying crushing force to the material, the force being applied substantially in translation only, and normal to the interface of the tool surface and the material, and with a minimum of twist and side movement at said interface, and sintering the particles to form a coherent body.

7. A method for producing sintered semiconductor bodies, particularly of thermoelectric materials having high thermoelectric effectivity, from semiconducting substances, characterized in that as starting material for the sintering process a granular powder is used which is produced from the starting materials by at least one of the following operations: splitting, crushing between plates, impaction, beating, essentially without friction at the reducing tool and semiconductor interface.

8. The method according to claim 7, further characterized in that starting materials are used which, relative to respective n-type and p-type conductance, possess an at least nearly wholly compensated fundamental lattice structure, and which have an addition of doping substance for obtaining maximum thermoelectric effectively.

9. The method according to claim 7, characterized in that the grain size is in the range 0.06 to 1. mm.

10. The method according to claim 7, characterized in that, before sintering, the said powder starting material is subjected to a warm pressing operation effected within a temperature range in which the material is plastically deformed, and that the subsequent sintering treatment is performed in a space containing an agency taken from the class consisting of protective gas, inert gas and vacuum, at a temperature between about 350 and 500° C., for approximately one hour.

11. A method of making a thermoelectric element of a thermocouple from a normall brittle semiconductor material, comprising subjecting said material to a comminution operation which minimizes frictional contact of the surfaces of the resulting comminuted particles with foreign substances, including that of the comminuting tool surface, said operation being carried out with a minimum of friction and grinding by applying crushing force to the material, the force being applied substantially, in translation only, and normal to the interface of the tool surface and the material, and with a minimum of twist and side movement at said interface and thereafter subjecting the comminuted material to a warm pressing operation carried out in a temperature range in which the material is plastically deformable, and subsequently sintering.

12. The method defined in claim 11, the material being taken from the bismuth-tellurium system, and being predoped to provide a desired conductance type.

13. A method of making a semiconductor body from a normally brittle semiconductor material, comprising subjecting said material to a comminution operation which minimizes frictional contact of the surfaces of the resulting comminuted particles with foreign substances, including that of the comminuting tool surface, said operation being carried out with a minmum of friction and grinding by applying crushing force to the material, the force being applied substantially in translation only, and substantial normal to the interface of the tool surface and the material, and with a minimum of twist and side movement at said interface and separating the particle sizes that are between about 0.06 and 1 millimeter in largest dimension, and sintering the separated particles together to form said body.

14. The method defined in claim 13, the method being further characterized in that, before sintering the separated particles are subjected to a warm pressing operation in a temperature range in which the material is plastically deformable.

15.The method defined in claim 14, the material being taken from the bismuth-tellurium system, and being predoped to provide a desired conductance type.

16. The method of claim 14, the material being $Bi_2Te_3$, and being doped to provide the desired conductance type.

17. The method defined in claim 2, the material being $Bi_2Te_3$, and being doped to provide the desired conductance type.

18. A method of making a thermoelectric element of a thermocouple from bismuth-tellurium semiconductor material, comprising subjecting bismuth-tellurium alloy, containing about 52% bismuth, to comminution by a pressing and crushing procedure which minimizes frictional contact of the surfaces of the resulting comminuted particles with foreign substances, said procedure being carried out with a minimum of friction and grinding by disposing the material between two relatively non-rotary surfaces and applying pressure, separating the particle sizes that are between 0.06 and 1 millimeter in largest dimension, and subjecting the separated particles to a warm pressing and sintering operation.

References Cited in the file of this patent

UNITED STATES PATENTS

| | | |
|---|---|---|
| 2,543,331 | Okolicsanyi | Feb. 27, 1951 |
| 2,952,980 | Douglas | Sept. 20, 1960 |

FOREIGN PATENTS

| | | |
|---|---|---|
| 836,943 | Germany | Apr. 17, 1952 |

OTHER REFERENCES

Horne et al.: RCA Technical Note No. 304, November 1959, 1 page.

Horne: RCA Technical Note No. 305, November 1959, 1 page.